US007219003B2

(12) United States Patent
Hagel et al.

(10) Patent No.: US 7,219,003 B2
(45) Date of Patent: May 15, 2007

(54) REGULATING THE MODE OF OPERATION OF AN INTERNAL COMBUSTION ENGINE

(75) Inventors: Reinhold Hagel, Pinzberg (DE); Stephan Krell, Schwabach (DE); Peter Schimmelpfennig, Erlangen (DE); Mehmet Tuna, Fuerth (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 60 days.

(21) Appl. No.: 10/523,138

(22) PCT Filed: Jun. 14, 2003

(86) PCT No.: PCT/DE03/01983

§ 371 (c)(1),
(2), (4) Date: Jan. 31, 2005

(87) PCT Pub. No.: WO2004/016930

PCT Pub. Date: Feb. 26, 2004

(65) Prior Publication Data

US 2005/0229904 A1 Oct. 20, 2005

(30) Foreign Application Priority Data

Jul. 31, 2002 (DE) ................................ 102 35 665

(51) Int. Cl.
*G06F 19/00* (2006.01)
*F02M 51/00* (2006.01)

(52) U.S. Cl. ...................... 701/104; 123/436; 123/488; 701/111

(58) Field of Classification Search ................ 701/104, 701/110, 111; 123/436, 419, 488; 73/116, 73/117.2, 117.3
See application file for complete search history.

(56) References Cited

U.S. PATENT DOCUMENTS 5,479,818 A * 1/1996 Walter et al. ................. 73/116

(Continued)

FOREIGN PATENT DOCUMENTS

WO WO 99/44028 9/1999

(Continued)

OTHER PUBLICATIONS

A. L. Lattka et al., "Application of the Hartley transform in monitoring and diagnosis of machines", 8129 AT Automatisierungstechnik; vol. 37, No. 9, Oldenbourg Verlag; Munich, Federal Republic of Germany; Sep. 1989. pp. 349-354, XP000066109, ISSN: 0718-2312, with English Abstract.

*Primary Examiner*—Stephen K. Cronin
*Assistant Examiner*—Johnny H. Hoang
(74) *Attorney, Agent, or Firm*—W. F. Fasse; W. G. Fasse

(57) ABSTRACT

Combustion failures of an internal combustion engine are controlled in closed loop fashion by sampling an engine r.p.m. to obtain a speed signal. The speed signal is subjected to a Hartley-Transformation to obtain angular frequencies or engine orders which are further processed to identify the cylinder which had a combustion failure and thereby reduced an actual engine power output compared to a rated power output. A power output correcting signal is produced and supplied to the engine. The system for performing these steps includes at least a speed signal sampler, a frequency analyzer to perform the Hartley-Transformation, a cylinder identifier or classifier and a controller which supplies the closed loop control signal to the engine.

13 Claims, 2 Drawing Sheets

U.S. PATENT DOCUMENTS

| | | | |
|---|---|---|---|
| 6,021,758 | A | 2/2000 | Carey et al. |
| 6,357,287 | B1 | 3/2002 | Jin |

FOREIGN PATENT DOCUMENTS

| | | |
|---|---|---|
| WO | WO 02/38936 | 5/2002 |

* cited by examiner

REGULATING THE MODE OF OPERATION OF AN INTERNAL COMBUSTION ENGINE

FIELD OF THE INVENTION

The invention relates to a closed loop control method for controlling the operating mode of an internal combustion engine as well as to a device for controlling the operating mode of an internal combustion engine of a motor vehicle in accordance with the present method.

BACKGROUND INFORMATION

In particular, the invention relates to a method for detecting and controlling in a closed loop the uneven running of an IC engine. A control device embodying a method of this type, which typically exists with modern vehicles, is e.g. also known as Engine Smoothness Control (ESC). Many cases of engine smoothness control systems of this type are known, so that the design and functionality of the different, known engine smoothness control systems is not explained in detail hereinafter.

Based on the unavoidable existence of process tolerances of the injection system as well as by the occurring ageing effects different fuel quantities are proportioned to the cylinders.

Even minor differences of the fuel quantities supplied to the cylinders result in torque variations, what may be the cause of unwanted vibrations for examples of mirrors, steering wheels and the like. Such vibrations have a particular unwanted influence in case of the IC engine of the motor vehicle, as here the engines are often rocked, which must be taken into consideration when dimensioning the engine construction, as this may possibly have a negative impact on the life time of the engine. Moreover, the above mentioned differences in the injected fuel quantity have an unfavorable influence on the noise, the life time and on the emissions of the IC engine. It is understandably essential to avoid these unwanted influences.

The above mentioned torque variations are reflected for instance in the instantaneous crankshaft speed and in the instantaneous crankshaft acceleration, which can be measured and analyzed in the engine control device.

SUMMARY OF THE INVENTION

Starting from here it is the object of the present invention to avoid or at least diminish to the greatest possible extend the torque changes or variations at a uniform crankshaft speed.

This object has been achieved in accordance with the invention by controlling, in closed loop fashion, the operation of an internal combustion engine including engine cylinders by performing the following steps:

a) sampling an engine speed signal,
b) applying a Hartley-transformation to said engine speed signal for transforming said engine speed signal into an angular frequency range,
c) analyzing said angular frequency range for producing individual angular frequency orders representing phase information and amplitude information,
d) performing a cylinder classification based on said phase information and said amplitude information by first comparing said phase information with a given reference phase value and by second comparing said amplitude information with a given first amplitude threshold value, said first comparing and said second comparing yielding individual cylinder informations for each cylinder of said engine cylinders,
e) processing said individual cylinder informations for identifying, based on said first phase comparing, any cylinder which is causing an uneven running of said internal combustion engine for further identifying, also based on said first phase comparing, a fuel adjustment direction for each individual cylinder including said cylinder causing said uneven running, and for determining, based on said second amplitude comparing, an injection fuel quantity required for correcting said uneven running of said internal combustion engine,
f) generating in response to said processing a closed loop control signal and applying said closed loop control signal to an engine controller for correcting said uneven running of said internal combustion engine,
g) detecting a misfiring of any one of said engine cylinders by further comparing said amplitude information with a respective second given amplitude threshold value to provide information for concluding whether said uneven running is caused by said misfiring when said amplitude information exceeds said respective second given amplitude threshold value,
h) detecting an actual power output of said internal combustion engine,
i) comparing said actual power output with a rated power output of said internal combustion engine to provide a reduced power output information,
j) modifying said closed loop control signal in response to said reduced power output information, and
k) applying said modified closed loop control signal to said engine controller for controlling a fuel injection to all said engine cylinders for correcting said actual power output with reference to said rated power output.

According to the invention there is further provided an apparatus for performing the present method. Such apparatus comprises the following components: a speed signal sampling sensor for generating an engine speed signal, a frequency analyzer having an input for receiving said engine speed signal for performing a Hartley-transformation on said engine speed signal thereby converting said engine speed signal into an angular frequency range, said frequency analyzer producing from said angular frequency range individual angular frequency orders, a cylinder classifier having an input connected to an output of said frequency analyzer, and a controller having an input connected to an output of said cylinder classifier for receiving an input signal from said cylinder classifier for generating a closed loop control signal, said controller having an output connected to said internal combustion engine for said closed loop control, wherein said signal sampler sensor, said frequency analyzer and said cylinder classifier are adapted for detecting a misfiring cylinder of said internal combustion engine, and wherein said signal sampler sensor, said frequency analyzer, said cylinder classifier and said controller are further adapted for generating closed loop control signals for said internal combustion engine for tracking any one of an engine torque and an engine power output.

A motor vehicle with an IC engine having at least one cylinder and equipped or controlled according to the invention is part of the invention.

The method according to the invention is able to detect the uneven running starting from a detected speed signal and to diminish it by an adequate adjustment of the injected fuel quantities. This adjustment is effected in accordance with the invention by a closed loop control system, which recognizes which cylinder(s) is/are to be adjusted. Advantageously, the control system provides also an information, which discloses apart from the qualitative information also a quantitative information on the extent of the adjustment, i.e. which cylinder is to be adjusted to what extent.

For this purpose the speed signal is transformed into an angular-frequency-range thereby obtaining spectral components or individual frequencies of this angular frequency range. These spectral components or individual frequencies are also called orders. Advantageously, the transformation is effected with the aid of the Hartley-transformation. Since the adjustment of single cylinders, in particular, has an impact on the low-frequency spectral orders, primarily these low-frequency spectral orders diminish the uneven running. For adjusting the uneven running to zero, a solution is seen in correcting primarily these low-frequency spectral portions to zero. For this purpose a controller is provided for the IC engine, which drastically reduces the disturbing spectral portions in the entire operating range and thus clearly improves the vibration behavior of the entire drive train.

The invention further relates to a method for detecting misfires of an IC engine referred to as Misfire Detection.

The invention further relates to a method for detecting and controlling the released mean torque and the mean power, resp., of an IC engine.

Figure 1:
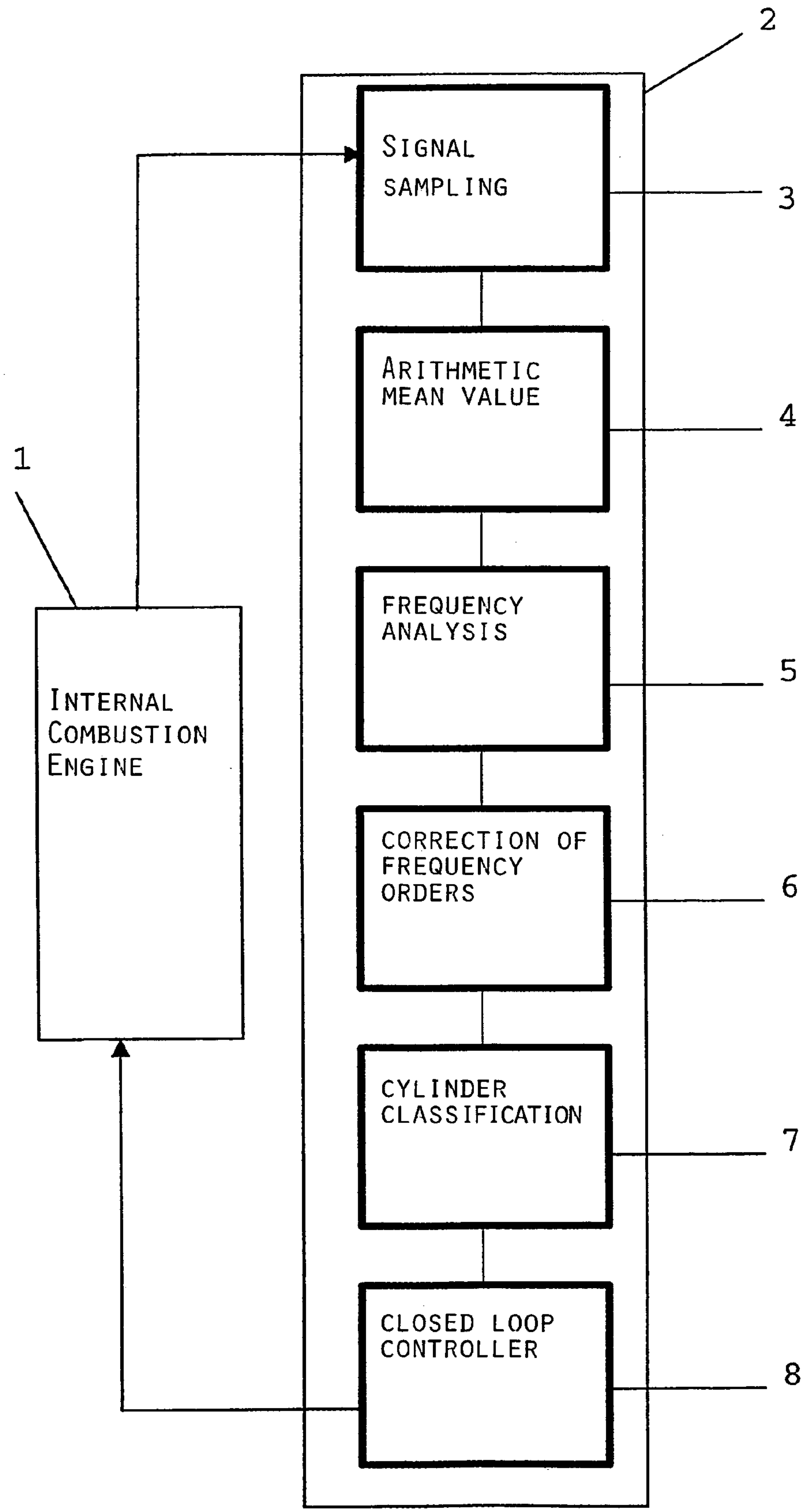
FIG. 1 shows a block diagram of a control device according to the invention for an IC engine, on the basis of which the method according to the invention is shown.

DETAILED DESCRIPTION OF PREFERRED EXAMPLE EMBODIMENTS AND OF THE BEST MODE OF THE INVENTION

Like reference numerals refer to like elements or elements with identical functions throughout all views, unless otherwise mentioned. In this context the term "control" refers to a closed loop control.

In FIG. 1 a self-igniting IC engine in a vehicle is shown under reference numeral 1 and the control device according to the invention for controlling the cylinder adjustment of the IC engine is shown under reference numeral 2.

The control device 2 comprises a device for sampling signals 3, which detects a rotation of the crankshaft and which generates a signal derived from it. This typically digital signal is supplied to a downstream arranged device 4, which starting from the signal supplied by the device for sampling signals 3 averages an arithmetic mean value. Subsequently, this information is delivered to a device for frequency analysis 5, which performs a spectral analysis. This spectral analysis is then further processed in a correction device 6, which corrects the frequency portions. With the data or information obtained in this way a cylinder classification is performed in a device 7 which is described in detail hereinafter. At the output of the device 7 a classification signal can be tapped, which can be supplied to a downstream controller 8. The controller 8 generates from it a control signal, which can be injected into the IC engine so that the cylinders can be adapted optimally to the given conditions in accordance with the requirements.

Though in FIG. 1 devices 4, 6 have been shown, it must be pointed out that one could do also without one or both of these devices, without considerably affecting the function of the control method and device according to the invention.

Further, the present invention is not restricted to self-igniting IC engines, but can also advantageously be used, in principle, with any IC engines however embodied.

Figure 2:
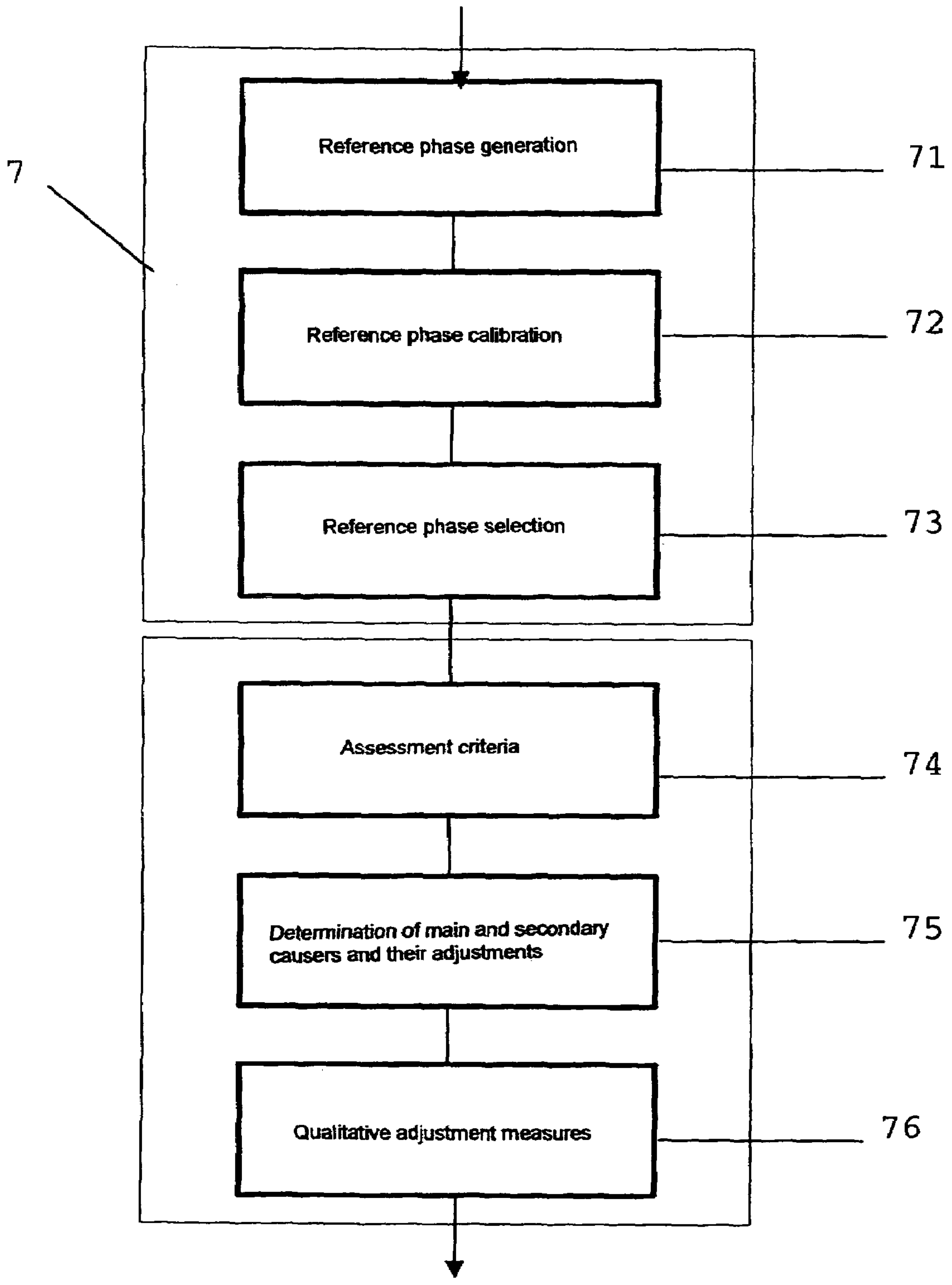
FIG. 2 shows a detailed block diagram, which illustrates in more detail the block of the cylinder classification.

FIG. 2 shows a detailed block diagram for illustrating the device 7 for cylinder classification. The device 7 contains in a first segment a means for reference phase generation 71, to which means for reference phase calibration 72 and reference phase selection 73 are downstream arranged. In a second segment a device 74 is provided, for which e.g. assessment criteria are determined or calculated, which are accessible later on. Based hereupon the main causers and/or the secondary causers of a disturbance or a deviation are determined. In addition or as an alternative, a possible adjustment for correcting the disturbance and deviation, resp., can be derived already at this moment. In the downstream unit 76 the qualitative and, if necessary, also the quantitative degrees of adjustment can be determined.

The function of the present invention will now be described in detail with reference to FIGS. 1 and 2 as follows:

The method according to the invention is primarily based on the analysis of the engine speed. For this e.g. a transmitter wheel with preferably equidistant angle markings is arranged at the crankshaft. The time periods between the individual markings of the rotating transmitter wheel are detected by a sensor, for instance an inductive or an optical sensor. Subsequently, the signal detected in this way is converted into revolution speeds in a program-controlled unit, for instance a microcontroller, microprocessor or the like. This program-controlled unit can be a component of the control device 2 according to the invention or can also be contained in the engine control. Conversely, also the control device 2 according to the invention can be a component of the engine control.

Thus equidistant angle distances sampling values of the crankshaft speed are available. The number of the angle markings is to be chosen to be high enough that the sampling theorem can be complied with.

In case of a quasi-stationary operating state the arithmetic mean value is averaged starting from at least two successive crankshaft speed segments having a length of 720°. The crankshaft speed segments of the length 720° are also called working cycles. Averaging the arithmetic mean value serves to eliminate cyclical variations which result from an uneven combustion. In addition or as an alternative, the arithmetic averaging could also be performed in the angle-frequency range. For this purpose the above mentioned Hartley frequency transformation must be applied to each individual analyzable working cycle. In a further embodiment one could do without the device 4 for arithmetic averaging, although the invention with a device for arithmetic averaging functions better. The device 4 for arithmetic averaging could also be arranged at another place in the control device 2. A "quasi-stationary operating state" as mentioned above, means in this context that engine operating parameters at the beginning and at the end of an engine speed signal sampling cycle differ only insignificantly from each other.

In the ensuing method step the averaged speed signal (cycle duration 720° of the crankshaft) is subject to a spectral analysis. For the transformation a Discrete Hartley-Transformation (DHT) is performed in accordance with the invention. The said DHT-Transformation, which stems from image processing, unlike the Fourier Transformation which is usually used and widely spread in digital signal processing and telecommunications offers the particular advantage that it can be calculated by exclusively real operations. Here, the speed signal is separated into individual angle-frequencies, also called orders, which serve for assessing the uneven running. Here, the vibrations show a frequency, which is smaller than double the engine speed. As the adjustment of individual cylinders mainly affects the amplitudes of the low-frequent vibrations, in case of a 4-cylinder engine the amplitudes of the 0.5th and of the first order represent the actual values for uneven running. Said orders, hereinafter referred to as relevant orders, can be affected by the injection and designate vibrations with the frequency of half and simple engine speed, respectively. These are clearly diminished by means of the method according to the invention. In this connection the value zero represents the nominal value for the amplitude of the 0.5th and of the first order. Complex numerical values can be derived from the spectral transformation applied to the speed signal, which values can be converted for the respective orders into quantity (or amplitude) and phase.

Here it must be noted that in case of a 6-cylinder engine in addition the 1.5th order, in case of an 8-cylinder engine in addition the 1.5th and the second order would have to be taken into account.

Since the calculated complex numerical values namely amplitude values and phase values representing informations are generally tampered due to typically appearing parasitic effects (transmitter wheel or sensor errors, moments of inertia, etc.), these are eliminated with the aid of an advantageously provided so-called towed correction. For this purpose a stationary towed operation is performed. A towed operation is an operating state without fuel injection. In such a towed operation measurements are made for instance of the instantaneous crankshaft speed. The subsequent application of the Hartley-Transformation delivers speed-dependent correction values for the vibrations of the 0.5th and of the 1.0st order. These correction values are stored in the control device.

One can do also without this device 6 for correcting the frequency orders, although the control device 2 according to the invention functions better with this device 6. Moreover, this correction device 6 could perform a correction other than the towed correction.

The cylinders to be adjusted are detected with the aid of speed and load dependent reference phases, which are stored in the control device 8 for the relevant orders. Subsequent to the determination of the reference phases, which may be obtained from an engine testing stand or in the driving mode, the reference phases are also subjected to a towed correction. In addition a calibration factor can be derived from the combination of the relevant orders of the reference phases.

The corrected engine orders represent the basis for the next method step. If the amplitudes of the vibrations of the 0.5th and of first order exceed a given threshold value and if a quasi-stationary operating state is on hand, the control is activated.

Reference phases are assigned to the measured phases of the 0.5th and of the first order (1.0st order). The reference phase of the 0.5th order, which is closest to the measured phase, is referred to as the primary phase, the related cylinder as the primary or first cylinder. The reference phase of the 1.0st order, which is the second closest to the measured phase is referred to as the secondary phase and the related cylinder as the secondary or second cylinder.

By means of the reference phases assigned to the measured phases and the measured amplitudes and phases assessment criteria are established while taking into account the respective load and speed situation, with the aid of which criteria the cylinders to be adjusted and their necessary direction of adjustment are determined. In the present case four assessment criteria are determined, which are referred to hereinafter as PK1-value, PK2-value, PK3-value, AK-value.

By means of the primary phase, the reference phase of the first order and a calibration factor a so-called PK1-value is calculated, which is compared with a given threshold. Equally, a so-called PK2-value is calculated from the primary phase, the secondary phase, the measured amplitude and the measured phase of the 0.5th order, which value is compared with a further given threshold.

Dependent from an exceeding of said thresholds the logic values "HIGH" and "LOW" are associated to the PK1- and PK2-values. Optionally, PK2 can also be determined from the measured phase and the primary phase, i.e from the distance of both phases.

As a further criterion the so-called AK-value is required. For determining the AK-value the load and speed dependent ratio of the measured amplitudes of the 0.5th and of the first order are compared with a further amplitude threshold value. The comparison with the further amplitude threshold value delivers the logic value "HIGH" and "LOW", resp., for the AK-value. In addition or as an alternative, also a so-called PK3-value, which is determined by means of the primary phase, a complementary primary phase (=phase of the cylinder not closest to the primary cylinder), the measured amplitude and the measured phase, can be compared with a still further threshold, thus obtaining the logic value "HIGH" or "LOW" for the PK3-value.

In a further method step, the respective cylinder to be adjusted and if necessary also the respective necessary adjustment direction are determined, said direction indicating whether acceleration or deceleration of the engine is required.

The PK1-value is used for determining the relevant adjusted cylinder, for instance the main causer of the adjustment, and its direction of adjustment. If for instance PK1="HIGH", the main causer of the adjustment is the cylinder related to the primary phase. Moreover, the identified cylinder is too greasy, i.e. a too large fuel quantity is supplied to the cylinder. In this case the injected fuel quantity of this cylinder should be reduced.

The values PK1 and PK2 combined with the AK-value—optionally also with the PK3-value—reveal the cylinder with the second highest portion of the adjustment (=secondary causer) as well as its direction of adjustment.

The contribution of adjustment of the secondary causer is typically determined relatively to the main causer. The relative contribution of the secondary causer can be determined in analytic manner. As an alternative, the secondary causer can be suppressed. In this case typically merely a single cylinder, namely the main causer, is adjusted.

The measured relevant orders are advantageously compensated or at least diminished to the greatest possible extent by generating corresponding counter vibrations. For this purpose the determined qualitative adjustments of the main causer and/or the secondary causer or causers are distributed to all cylinders such that the sum of the adjustments over all four cylinders equals or nearly equals zero. This compensation does not change the original engine torque and the original engine power, respectively.

The amplitudes of the relevant orders represent a control deviation and are subjected to a speed and load dependent weighting. Finally, with the aid of the determined qualitative adjustments and the actual amplitudes of the relevant orders, individual, quantitative correction factors are determined. These correction factors are supplied to a closed loop controller 8, which in the case that there is no controller limitation, influences the individual injected fuel quantities necessary for the respective cylinders. In the present example embodiment the controller 8 is a simple I-controller. However, any control device could be used here, which depends on the determined correction values, and which provides a control signal at its output.

Apart from the now described functionality the control device according to the invention comprises advantageously also additional functionalities. The functionalities of the controlling device according to the invention described hereinafter can be implemented additionally or as an alternative to the above described control of the uneven running of an IC engine (ESC-control).

Misfire Detection

Due to the unwanted occurrence of misfires that are unavoidable in an IC engine, non-burned fuel can be released into the environment. Moreover, this may result in a permanent damage of exhaust gas treatment systems existing in modern vehicles, for example of the catalytic converter. Both implicate that the vehicle exhaust pollution of the environment is increased. To avoid this to the greatest possible extent there are national and international regulations and laws (e.g. OBD II, E-OBD), which prescribe inter alia a device for recognizing misfires in motor vehicles.

The occurrence of misfires leads to torque variations, which reflect for example in the instantaneous crankshaft speed and in the instantaneous crankshaft acceleration, resp. By means of the method according to the invention described hereinafter it is possible to detect misfires starting from a speed signal. Further it is possible to recognize which cylinder has misfires. For this the speed signal is transformed into the angle-frequency range in an appropriate manner as in the engine smoothness control. As the adjustment of individual cylinders mainly impacts the low-frequent spectral portions, these are primarily used for detecting misfires.

The method according to the invention in turn is based on the analysis of the engine speed. For this purpose e.g. a transmitter wheel with preferably equidistant angle markings is arranged at the crankshaft. The periods between the individual markings of the rotating transmitter wheel are detected by a sensor and are subsequently converted in the microcontroller into speeds.

When sampling engine speed signals the sampled values of the crankshaft speed are determined in equidistant angle distances. Here it must be ensured that the number of angle markings on the speed sensor is high enough so that compliance with the sampling theorem is assured.

In case of a quasi-stationary operating state a 720° long section of the speed signal, which may also be referred to as working cycle, is subjected to a spectral analysis by means of a Discrete Hartley-Transformation (DHT). In the analysis the speed signal is separated into individual angle-frequencies, which serve for detecting misfires. The adjustment of individual cylinders mainly affects the amplitudes of the vibrations, which have a frequency smaller than double the engine speed. Therefore, in a 4-cylinder engine the amplitudes of the 0.5th and of 1.0st order represent sizes from which conclusions can be drawn to the existence of misfires. The said orders, hereinafter referred to as relevant orders, designate vibrations with the frequency of half the engine speed, or the actual engine speed. It is noted that in case of a 6-cylinder engine in addition the 1.5th order, in case of an 8-cylinder engine in addition the 1.5th and the second order would have to be taken into account. In general, the spectral transformation applied to the speed signal delivers complex numerical values, which are converted for the respective orders into amplitude and phase values, respectively.

As the calculated complex numerical values or rather the amplitude- and phase values, are generally falsified due to always appearing parasitic effects—for instance a transmitter wheel or sensor error, an error of the moment of inertia, etc.—these are eliminated with the aid of a so-called towed correction. For this purpose measurements are made in a stationary towed operation (=operating state without fuel injection), for instance of the instantaneous crankshaft speed. The subsequent application of the Hartley-Transformation delivers advantageously speed-dependent correction values for the vibrations of the 0.5th and of the 1.0st order. These correction values are stored in the control device.

The occurrence of one or more simultaneously appearing misfires causes the amplitudes of the relevant orders to increase strongly. By analyzing these increased amplitudes the occurrence of a misfire can be displayed. The comparison of the amplitudes with a respective given threshold is performed in a so-called amplitude discriminatory which indicates the existence of misfires for each working cycle.

If for example the amplitudes of the 0.5th and of the first orders lie below the said threshold, there is no misfire. If both exceed them, it is recognized that either one cylinder or three cylinders have a misfire. Two misfires of adjacent cylinders are recognized if only the amplitude of the 0.5th order exceeds the threshold. Two misfires of complementary, i.e. cylinders that are not adjacent in the firing order, are on hand if only the amplitude of the first order exceeds the threshold.

The determination or detection of the cylinders which misfired, is effected in the block 7 (cylinder classification) with the aid of speed and load dependent reference phases, which are stored for the relevant orders in the control device. Subsequent to the determination of the reference phases, which may be effected at the dynamometer or in the driving mode, these are equally subject to a towed correction. In addition, from the combination of the relevant orders of the reference phases a calibration factor can be derived. Reference phases are assigned or correlated to the measured phases of the 0.5th and of the 1.0st order. The reference phase of the 0.5th order and the related cylinder which is closest to the measured phase of the 0.5th order, designates the so-called primary or first cylinder.

By means of the reference phases and the calibration factor a reference phase criterion is determined. By taking into account the respective threshold exceedings in the amplitude discriminator and the knowledge of the primary cylinder the misfiring cylinders are identified.

Torque Tracking—Performance Tracking

Due to the unavoidable occurrence of ageing effects of the engine and above all of its injection system the engine torque released by the IC engine and the released engine power, respectively, diminish over the years. This effect is considered as a deficiency in particular with commercial vehicles, as they demand much higher engine running times as required for passenger cars. Exchanging the engine is too expensive on the one hand and on the other hand a commercial vehicle also will not be usable for a longer period of time. In particular, the occurrence of manufacturing tolerances causes a more or less strong variation in the engine torque and as a consequence thereof a dropping of the engine power, which can often only be compensated by time-consuming compensation at the end of an assembly line when an engine is manufactured.

By arranging torque sensors or cylinder pressure sensors in the cylinders the engine torque and the engine power, resp., can in fact be determined, however, this requires additional structural expenditure. Variations in the released engine torque and in the released engine power, resp., reflect for instance in the instantaneous crankshaft speed and instantaneous crankshaft acceleration, resp. These can be analyzed in the engine control device while using an already existing sensor.

By means of the method according to the invention hereinafter described, it is possible to detect the released engine torque and the released engine power, resp., starting from the speed signal as well as to affect or correct this by an appropriate adjustment of the injected fuel quantities.

As the combustion energy is substantially contained in marked frequency portions of the speed signal, it is transformed into the angle-frequency range. The resulting spectral portions are also referred to as orders. By analyzing the amplitude of the vibration of the second order in case of a 4-cylinder engine conclusions can be drawn to the released engine torque and the released engine power, resp. As an alternative, also the $4^{th}$, $6^{th}$, $8^{th}$, etc. orders can be used for this. Accordingly, for instance with a 6-cylinder engine the amplitude of the vibration of the $3^{rd}$ order and with an 8-cylinder engine the amplitude of the vibration of the $4^{th}$ order and the even-numbered multiples of the said orders, resp., are analyzed.

After a suitable calibration the mentioned spectral portions represent actual values of the generated engine torque and the generated engine power, respectively, and can be compared with the engine torque and the respective engine power, respectively, demanded by the closed loop engine control device-provided for the engine, which minimized the difference between an actual engine torque and a nominal engine torque by varying the injected fuel quantity.

This embodiment of the method according to the invention is based on the analysis of the engine speed just as in the above described embodiments of the present methods. Here, again a transmitter wheel arranged at the crankshaft is provided with preferably equidistant angle-markings. The periods of time, which occur when the transmitter wheel rotates, between the individual markings of the rotating transmitter wheel are detected by a sensor and converted by a microcontroller into speeds assigned to these periods. Thus, in equidistant angle distances sampling values of the crankshaft speed are available. Also in this case it must be ensured that the number of samples taken is high enough to satisfy the sampling theorem.

In case of a quasi-stationary operating state the arithmetic mean value is averaged starting from at least two successive crankshaft speed segments having the length of 720°. Such averaging eliminates cyclical variations which result from an uneven combustion.

In the following method step the averaged speed signal (cycle duration 720° of the crankshaft) is subjected to a spectral analysis by means of a Discrete Hartley-Transformation (DHT), whereby the speed signal is separated into individual angle-frequencies, wherein in the method according to the invention the torque information is generated from the amplitude of the vibration of the second order (=vibrations with the frequency of the engine speed). Complex numerical values are generally provided by the spectral transformation applied to the speed signal, which values can be converted quantitatively into amplitude and phase values representing respective informations.

As the calculated complex numerical values or rather amplitude- and phase values, are generally tampered due to typically appearing parasitic effects (e.g. transmitter wheel errors, moments of inertia, etc.), these are eliminated with the aid of a correction device (i.e. towed correction). For this purpose measurements for instance of the instantaneous crankshaft speed, are made in a stationary towed operation (=operating state without fuel injection). The subsequent application of the Hartley-Transformation to these measurements provides speed-dependent correction values for the vibration of the second order. These correction values are stored in the control device (8).

As the amplitude of the second order, which is a measurement for the released engine torque and the released engine power, resp., increases with a fixed speed strictly monotonously with the load, it can be ascertained in or from a reference engine and can be stored as a function of the speed in a family of reference characteristics. This family of characteristics then serves as a reference for detecting the actual engine torque and the actual engine power, resp.

In addition or as an alternative, the calculation of the actual engine torque and of the actual engine power, resp. can be performed in an analytic manner.

The difference between the nominal engine torque requested by the engine control device and the actual engine torque is detected by a closed loop control system and is minimized by varying the injected fuel quantity. Before processing the introduced method the speed strokes can also be equated by means of a so-called engine smoothness control (ESC).

The above examples of embodiment have been depicted by way of an IC engine with four cylinders. However, the invention is not to be restricted to exclusively IC engines of this type, but can, of course, also be extended to IC engines with more or less than four cylinders in case of adequate adaptations that are obvious to the expert.

In the above example embodiments the arithmetic mean value was averaged respectively. However, the invention is not to be restricted exclusively on this, but can also very advantageously be used in case of a geometrical averaging of the mean value or the like.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

The invention claimed is:

1. A method for controlling, in closed loop fashion, the operation of an internal combustion engine including engine cylinders, said method comprising the following steps:

a) sampling an engine speed signal, b) applying a Hartley-transformation to said engine speed signal for transforming said engine speed signal into an angular frequency range, c) analyzing said angular frequency range for producing individual angular frequency orders representing phase information and amplitude information, d) performing a cylinder classification based on said phase information and said amplitude information by first comparing said phase information with a given reference phase value and by second comparing said amplitude information with a given first amplitude threshold value, said first comparing and said second comparing yielding individual cylinder informations for each cylinder of said engine cylinders, e) processing said individual cylinder informations for identifying, based on said first phase comparing, any cylinder which is causing an uneven running of said internal combustion engine for further identifying, also based on said first phase comparing, a fuel adjustment direction for each individual cylinder including said cylinder causing said uneven running, and for determining, based on said second amplitude comparing, an injection fuel quantity required for correcting said uneven running of said internal combustion engine, f) generating in response to said processing a closed loop control signal and applying said closed loop control signal to an engine controller for correcting said uneven running of said internal combustion engine, g) detecting a misfiring of any one of said engine cylinders by further comparing said amplitude information with a respective second given amplitude threshold value to provide information for concluding whether said uneven running is caused by said misfiring when said amplitude information exceeds said respective second given amplitude threshold value, h) detecting an actual power output of said internal combustion engine, i) comparing said actual power output with a rated power output of said internal combustion engine to provide a reduced power output information, j) modifying said closed loop control signal in response to said reduced power output information, and k) applying said modified closed loop control signal to said engine controller for controlling a fuel injection to all said engine cylinders for correcting said actual power output with reference to said rated power output.

2. The method of claim 1, further comprising assuring that operating parameters of said internal combustion engine differ insignificantly from each other at a beginning and at an end of said sampling of said engine speed signal, performing said sampling so that at least two sequential speed signal segments are sampled, and forming a mean value of said at least two sequential speed signal segments.

3. The method of claim 2, wherein said forming of a mean value is performed to obtain an arithmetic mean value.

4. The method of claim 1, further comprising correcting any one of said individual angular frequency orders and said given reference phase value by performing the following substeps: temporarily stopping any fuel injection to said internal combustion engine to cause a towed operation, and performing said correcting as a towed correction for eliminating any parasitic effects from any one of said individual angular frequency orders and said given reference phase value.

5. The method of claim 1, further comprising performing said step (g) of detecting said misfiring by selecting out of said individual angular frequency orders low frequency individual angular frequency orders and deriving said amplitude information from said low frequency individual angular orders for said comparing to determine a misfiring cylinder.

6. The method of claim 1, further comprising performing the following substeps for said detecting of said misfiring of any one of said engine cylinders, providing speed and load dependent reference phases, combining said speed and load dependent reference phases to form a calibration factor, correlating said speed and load dependent reference phases to respective measured phases of said individual angular frequency orders for designating one of said engine cylinders as a first cylinder, and identifying said misfiring cylinder by taking into account said speed and load dependent reference phases, said calibration factor, knowledge of which cylinder is said first cylinder and that said amplitude information has exceeded said respective second given amplitude threshold value of step (g).

7. The method of claim 6, wherein said individual angular frequency orders representing phase and amplitude information include at least an 0.5th order and a 1.0st order, and further comprising correlating said speed and load dependent reference phases to measured phases of said 0.5th order and said 1.0st order, so that a speed and load dependent reference phase of the 0.5th order that is closest to the measured phase of the 0.5th order designates said first cylinder.

8. The method of claim 1, further comprising establishing said rated power output by taking respective amplitude measurements from a reference engine, storing said amplitude measurements as a function of speed in a memory to provide said rated power output for use in said comparing in said step (i).

9. An apparatus for controlling, in a closed loop control, the operation of an internal combustion engine, by performing the method of claim 1 said apparatus comprising: a speed signal sampling sensor (3) for generating an engine speed signal, a frequency analyzer (5) having an input for receiving said engine speed signal for performing a Hartley-transformation on said engine speed signal thereby converting said engine speed signal into an angular frequency range, said frequency analyzer (5) producing from said angular frequency range individual angular frequency orders, a cylinder classifier (7) having an input connected to an output of said frequency analyzer (5), and a controller (8) having an input connected to an output of said cylinder classifier for receiving an input signal from said cylinder classifier for generating a closed loop control signal, said controller (8) having an output connected to said internal combustion engine for said closed loop control, wherein said signal sampler sensor (3), said frequency analyzer (5) and said cylinder classifier (7) are adapted for detecting a misfiring cylinder of said internal combustion engine, and wherein said signal sampler sensor (3), said frequency analyzer (5), said cylinder classifier (7) and said controller (8) are further adapted for generating closed loop control signals for said internal combustion engine for tracking any one of an engine torque and an engine power output.

10. The apparatus of claim 9, further comprising a computer (4) operatively interposed between said signal sampler sensor (3) and said frequency analyzer (5) for calculating an arithmetic mean value of a plurality of said individual angular frequency orders.

11. The apparatus of claim 9, further comprising a frequency corrector (6) operatively interposed between said frequency analyzer (5) and said cylinder classifier (7) for correcting said individual angular frequency orders.

12. The apparatus of claim 9, wherein said cylinder classifier (7) comprises a generator (71) for generating reference phases, a calibrator (72) for calibrating said reference phases, and a selector (73) for selecting a reference phase, said cylinder classifier (7) further comprising means (74) for determining weighting factors, means (75) for determining any one of primary and secondary causers of any one of a disturbance and a deviation, and means (76) for generating qualitative fuel injection adjustment control signals for adjusting a fuel supply for said internal combustion engine, said generating of said fuel injection adjustment control signals taking into account any one of qualitative and quantitative parameters.

13. The apparatus of claim 9, wherein said controller (8) comprises any one of an I-control circuit and a PI-control circuit.

* * * * *